US005427496A

United States Patent [19]

Ratledge, Jr. et al.

[11] Patent Number: 5,427,496

[45] Date of Patent: Jun. 27, 1995

[54] APPARATUS FOR PACKING SEPARATED MATERIALS

[75] Inventors: Ralph H. Ratledge, Jr., Chattanooga; Jerald G. Zanzig, Signal Mountain, both of Tenn.

[73] Assignee: The Heil Co., Chattanooga, Tenn.

[21] Appl. No.: 176,106

[22] Filed: Dec. 29, 1993

Related U.S. Application Data

[63] Continuation-in-part of Ser. No. 940,532, Sep. 4, 1992, abandoned.

[51] Int. Cl.[6] .......... B65G 67/02

[52] U.S. Cl. .......... 414/525.2; 100/208; 100/233; 414/407; 414/409

[58] Field of Search .......... 414/406–409, 414/486, 492, 525.2, 525.5; 220/909; 100/193, 208, 271, 233

[56] References Cited

U.S. PATENT DOCUMENTS

| | | | |
|---|---|---|---|
| 2,826,318 | 3/1958 | Beasley | 414/525.2 |
| 3,232,463 | 2/1966 | Weir | 414/525.5 X |
| 3,370,525 | 2/1968 | Bowles | 414/525.55 X |
| 4,096,959 | 6/1978 | Schäffler | 414/525.5 X |
| 4,113,125 | 9/1978 | Schiller | 414/525.5 X |
| 4,992,019 | 2/1991 | Behling et al. | 414/525.2 |
| 5,035,563 | 7/1991 | Mezey | 414/409 |
| 5,122,025 | 6/1992 | Glomski | 414/408 X |
| 5,176,488 | 1/1993 | Boda | 414/525.5 X |
| 5,316,430 | 5/1994 | Horning et al. | 414/407 |
| 5,324,161 | 6/1994 | Thobe | 414/406 X |

FOREIGN PATENT DOCUMENTS

| | | | |
|---|---|---|---|
| 0184739 | 6/1986 | European Pat. Off. | 414/409 |
| 0314238 | 5/1989 | European Pat. Off. | 414/406 |
| 04925699 | 7/1992 | European Pat. Off. | 414/525.2 |
| 2357435 | 5/1975 | Germany | 414/525.5 |
| 2191461 | 12/1987 | United Kingdom | 414/409 |

*Primary Examiner*—David A. Bucci

*Attorney, Agent, or Firm*—McAndrews, Held & Malloy, Ltd.

[57] ABSTRACT

An apparatus for packing separated materials includes a material receiving container having at least one horizontal longitudinally extending partition subdividing the container into upper and lower compartments. The container is provided with a packing device for simultaneously compacting the materials in the upper and lower compartments. The packing device includes a lower packer blade mounted to lower swing arms that are pivotally mounted for pendular movement toward and away from the rear end of the container, to compact the materials in the lower compartment, an upper packer blade mounted to upper swing arms that are pivotally mounted for pendular movement toward and away from the rear end of the container, to compact the materials in the upper compartment, and swing links pivotally connecting the upper and lower swing arms so that the upper and lower packer blades move simultaneously.

19 Claims, 8 Drawing Sheets

APPARATUS FOR PACKING SEPARATED MATERIALS

CROSS-REFERENCE TO RELATED APPLICATIONS

This application is a continuation-in-part of application Ser. No. 07/940,532, filed Sep. 4,1992,now abandoned.

BACKGROUND OF THE INVENTION

This invention relates to material-receiving vehicles having a material-receiving container subdivided into one or more compartments for separating materials, especially recyclable materials, such as newsprint, from non-recyclable waste material. More particularly, the invention relates to an improved apparatus for packing the separated materials into the compartments.

Vehicles having compartments for separating different materials are known. For example, U.S. Pat. No. 4,425,070 to Howells et al. discloses a conventional, rear-loading trash compactor having an intermediate space between the front cab and the rear compactor which contains separate compartments for recyclable materials. Howells et al. do not, however, disclose any means for compacting the recyclable materials in the separate compartments.

Another prior art reference, German Patent No. DE 3537546 A1, discloses a partitioned refuse vehicle that employs a hydraulically actuated packing platen in each longitudinally extending compartment. The packing platens slide lengthwise of the refuse compartment along longitudinal guide rails or tracks secured to the sidewalls or bottom wall of the refuse compartments.

The rail or track system for guiding the packing platens presents several disadvantages. The rails or tracks are subject to heavy wear because of the strong forces needed to slide the packing platens along. This, in turn, leads to higher maintenance costs and downtime for the refuse vehicle. In addition, the rails or tracks add significantly to the gross weight of the refuse vehicle, resulting in a vehicle that is undesirably heavy and expensive, and significantly reduces the net payload the vehicle can haul.

The present invention is directed to overcoming these and other disadvantages inherent in a track system for guiding the packing platens.

SUMMARY OF THE INVENTION

An object of the invention is to provide an improved packing apparatus in a partitioned vehicle that overcomes the deficiencies of prior art designs.

Another object of the invention is to provide a packing apparatus that is relatively lightweight in order to maximize the net payload the vehicle can haul.

A further object of the invention is to provide a packing apparatus that is subject to reduced wear, thus decreasing maintenance costs and downtime of the vehicle.

Yet another object of the invention is to provide a packing apparatus that permits continuous loading, packing, and unloading operations without commingling the separated materials.

A still further object of the invention is to provide a packing apparatus that provides increased compaction forces.

These and other objects are achieved by an improved packing device for packing separated materials in a partitioned material-receiving vehicle. The vehicle includes a material-receiving container having a bottom wall, two lateral side walls, a top wall, a discharge end and a non-discharge end, and at least one partition subdividing the container into a first material-receiving compartment and a second material-receiving compartment. Each material-receiving compartment having a discharge end and a non-discharge end.

A first packer blade is disposed in the first compartment and is moveable between a first position adjacent to the non-discharge end of the first compartment along a non-linear path to a second position so as to compact the material received in the first compartment.

A second packer blade is disposed in the second compartment and is moveable between a first position adjacent to the non-discharge end of the second compartment to a second position so as to compact the material received in the second compartment. The packing device also includes means for moving the first and second packer blades between their first and second positions.

In a preferred embodiment, the first and second packer blades are connected for coordinated and simultaneous pendular movement by means of connecting links. The connecting links each have a first end which is pivotally connected to a first pair of swing arms on which the first packer blade is mounted, and a second end which is pivotally connected to a second pair of swing arms on which the second packer blade is mounted. The pendular movement of the swing arms and the packer blades, acting in concert with the pivotally mounted connecting links, create a condition of force amplification that results in a greater packing force with a relatively small input of force. Generally, the concerted movement of the swing arms and the connecting links results in a packing force for the second packer blade that is double that of the first packer blade. This is advantageous because it permits items requiring high compacting forces to be compacted in the upper compartment, while items that require lower compacting forces can be compacted simultaneously in the lower compartment. In addition, the relatively small force needed to achieve the increased packing force permits the utilization of smaller hydraulic cylinders and/or lower hydraulic pressures, thus making the packing device less costly to manufacture and operate.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
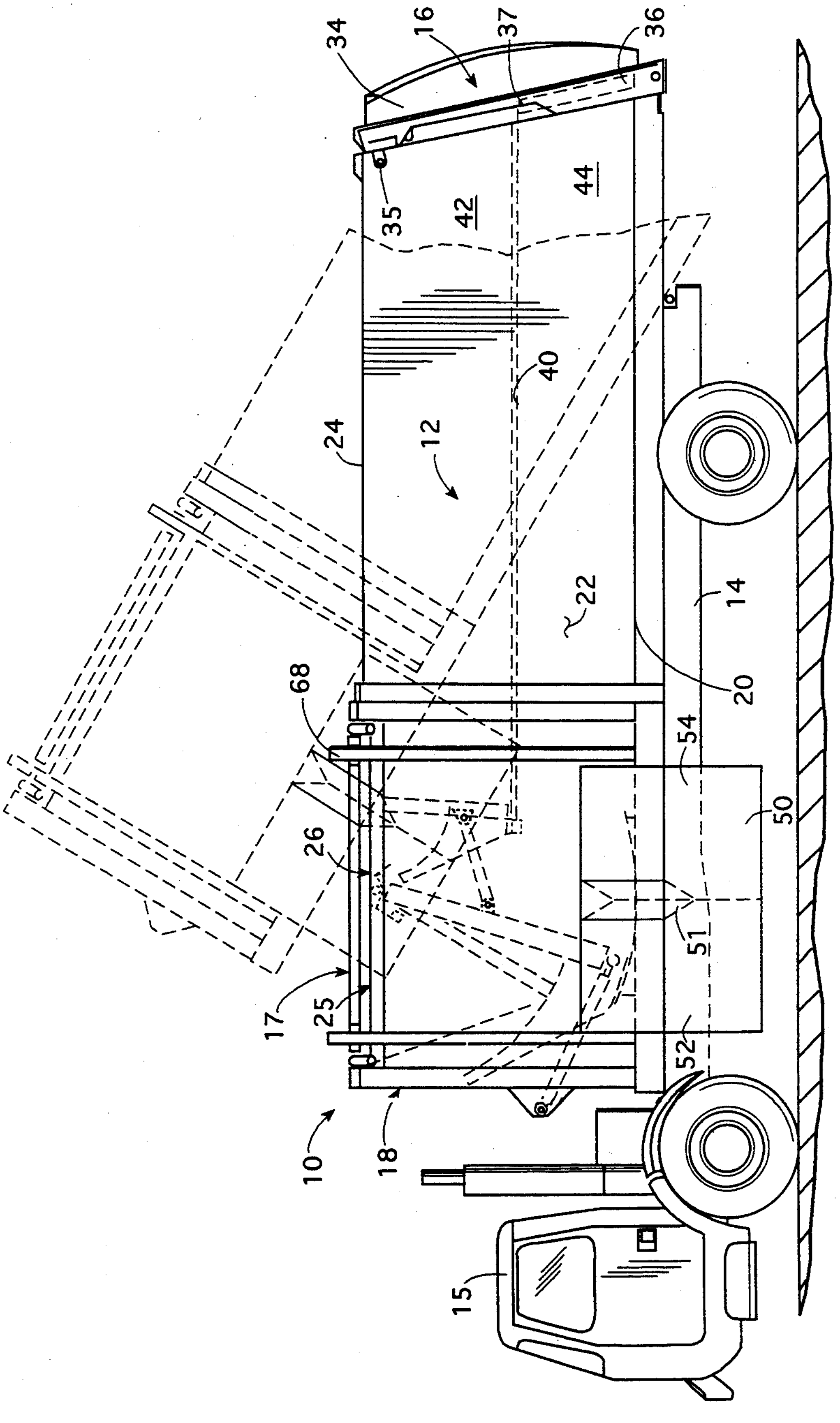
FIG. 1 is a side elevation view of a material collecting vehicle, showing in phantom the vehicle in dumping mode.

Referring now to FIG. 1, a rear discharge material collection vehicle, generally indicated at 10, includes a material-receiving and compacting container 12 mounted on a vehicle chassis 14, which includes a cab 15. The container 12 has a discharge end 16 and a non-discharge end 18, a hopper assembly, generally 17, adjacent the non-discharge end, and includes a bottom wall 20, lateral side walls 22 and a top wall 24. A horizontal partition 40 extends longitudinally toward the discharge end 16 and divides the container 12 into separate upper and lower compartments 42 and 44, respectively. The upper and lower compartments permit different types of material, such as recyclable and non-recyclable materials, to be separately stored and compacted.

The discharge end 16 of the container is provided with a primary discharge tailgate 34 secured to the rearward portion of the container 12 by pivotal mounting 35. The primary discharge tailgate 34 closes the discharge end 16. The discharge end 16 is also provided with a secondary discharge tailgate 36 having a pivotal mounting 37 securing the secondary tailgate to the container 12 adjacent the horizontal partition 40. The secondary discharge tailgate 36 is positioned within the primary discharge tailgate 34 and closes the rear end of the lower compartment 44. The primary and secondary discharge tailgates 34 and 36 permit the materials to be packed, retained and separately discharged from the upper and lower compartments 42 and 44, respectively.

Figure 2:
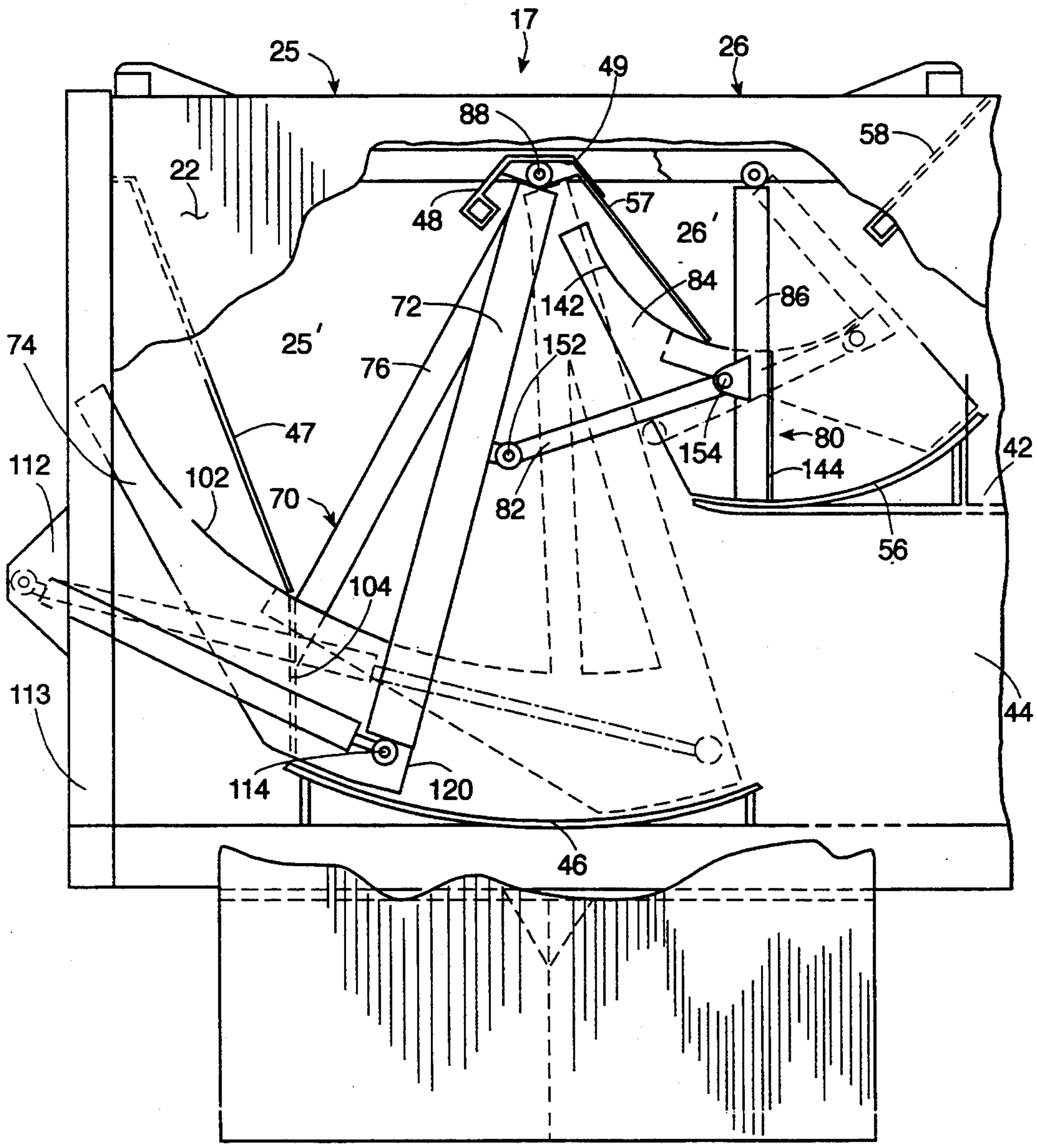
FIG. 2 is a partial side elevation cut away to show the packing device of the present invention.

The hopper assembly 17 has two upper loading openings 25 and 26 leading into a front or lower material receiving area 25′, and a rear or upper material receiving area 26′ respectively Referring to FIG. 2, the front material receiving area 25′ is defined by a rearwardly inclined chute front wall 47, a forwardly inclined chute rear wall 48, and the two container sidewalls 22. The rear material receiving area 26′ is defined by a rearwardly inclined chute front wall 57, a forwardly inclined chute rear wall 58, and the two container sidewalls 22. A header beam 49 extends between the container side walls 22, near the top of the hopper assembly 17, and separates the loading opening 25 and receiving area 25′ from the loading opening 26 and receiving area 26′. The header beam 49 is integral with the chute rear wall 48 and the chute front wall 57. The front receiving area 25′ funnels the material received from the loading opening 25 onto an arcuately shaped lower front hopper floor 46, while the rear receiving area 26′ funnels the material received from the loading opening 26 onto an arcuately shaped upper rear hopper floor 56.

An improved packing device is mounted within the hopper assembly 17 and compacts the material funneled onto the lower front and upper rear hopper floors, 46 and 56, respectively, into the lower and upper compartments 44 and 42, respectively. The packing device comprises a lower packing assembly, generally 70, and an upper packing assembly, generally 80, interconnected by a pair of connecting links 82 to permit simultaneous and coordinated movement of the lower and upper packing assemblies 70 and 80 respectively.

The lower packing assembly 70 includes a pair of lower swing arms 72, each of which extends downwardly from the header beam 49 and is adjacent to a respective container sidewall 22, a pair of support legs 76, angled downwardly and forwardly from the lower swing arms 72, and a lower packer blade 74 mounted on the lower ends of the swing arms 72 and the support legs 76. At the top of each swing arm 72 is a pin and bearing arrangement 88 which pivotally mounts the swing arm to the header beam 49. The pin and bearing arrangement 88 permits the lower packer blade 74 to move pendularly toward and away from the lower compartment 44. The lower packing assembly 70 is positioned within the hopper assembly 17 so that the lower edge of the packer blade 74 is closely spaced to the arcuately shaped lower hopper floor 46 throughout the pendular travel positions of the packer blade to prevent material from getting trapped underneath or forward of the lower packer blade 74.

Figure 3:
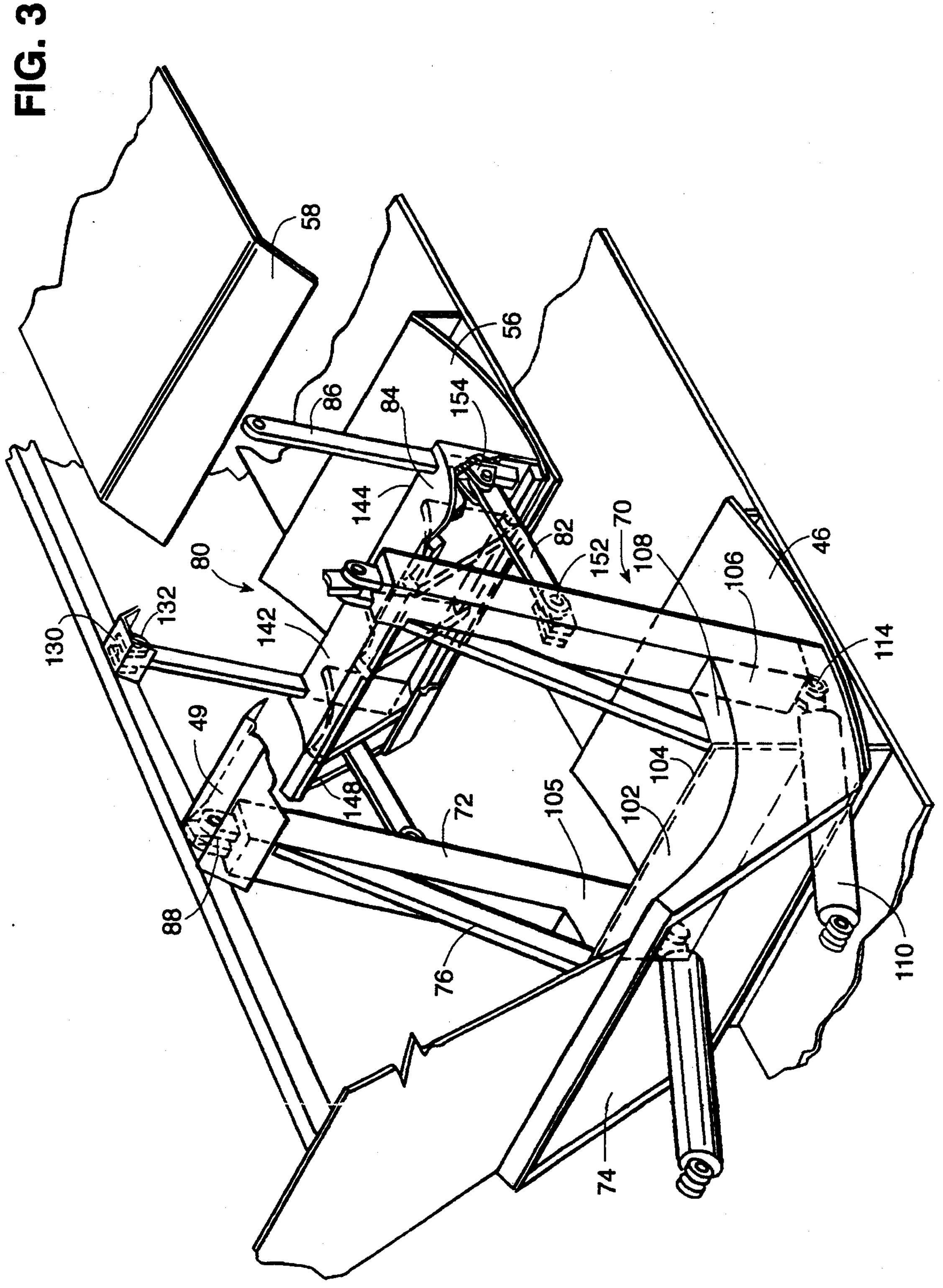
FIG. 3 is a perspective view of the packing deuce of the present invention.

Referring to FIGS. 2 and 3, the lower packer blade 74 has a forwardly extending, upwardly curved top face 102 that terminates at its rearward end in a substantially vertical packing face plate 104, and laterally spaced inner and outer side plates 105 and 106, respectively, at each side of the packer blade 74. The side plates 105 and 106 extend forwardly of the packing face plate 104 and rearwardly to the lower ends of the swing arms 72, and are mounted to the swing arms so that each swing arm 72 is sandwiched between an inner and an outer side panel 105 and 106, respectively. An upwardly curved top plate 108 overlies the side plates 105, 106 and is integral with the upwardly curved top face 102. Because the side panels 105 and 106 and the swing arms 72 extend rearward of the packing face plate 104, the packing face plate 104 does not extend the full width of the lower packer blade 74.

The upper packing assembly 80 includes a pair of upper swing arms 86 and an upper packer blade 84 mounted on the lower ends of the swing arms 86. Each upper swing arm 86 extends downwardly toward the upper hopper floor 56 from a bearing bracket 130 cantilevered from the container sidewall 22 in the loading opening 26. At the top of each upper swing arm 86 is a pin and bearing mounting 132 which pivotally mounts the swing arm to the bearing bracket 130. The pin and bearing mounting 132 permits the upper packer blade 84 to move pendularly toward and away from the upper compartment 42. The upper packing assembly 80 is positioned so that the lower edge of the upper packer blade 84 is closely spaced to the arcuately shaped upper hopper floor 56 throughout the pendular travel positions of the packer blade. This position prevents material from getting trapped underneath the upper packer blade 84 or from getting pushed forward of the packer blade and falling to the lower hopper floor 46.

The upper packer blade 84 includes a forwardly extending, upwardly curved top face 142 that terminates at its rearward end in a substantially vertical face plate 144, and an outer side panel 148 at each side of the packer blade 84.

The lower packer assembly 70 is joined to the upper packer assembly 80 by the connecting links 82. Each connecting link 82 is pivotally attached to a mounting bracket 152 on the lower swing arm 72 and is pivotally attached by a mounting bracket 154 on the upper swing arm 86.

Power means for operating the upper and lower packing assemblies comprises a pair of hydraulic cylinders 110, having one end of each pivotally connected to a mounting bracket 112 cantilevered from a beam 113 at the non-discharge end 18 of the container 12. The opposite end of each cylinder is attached by a pivotal mounting 114 to the base of the lower swing arm 72. Each hydraulic cylinder 110 operates within a space or tunnel defined by the side panels 105 and 106, and the top panel 108 of the lower packer blade 74. A closure piece 120 extending between the side panels 105 and 106 and downwardly from the lower swing arm 72 completes the isolation of this tunnel from the lower hopper floor 46 thereby preventing material from contacting the hydraulic cylinders 110.

The compacting cylinders 110 are reciprocally moveable from a closed forward position, shown in FIG. 3, to an extended rearward position shown in phantom in FIG. 2. The compacting cylinders 110 are connected to a fluid pump and hydraulic control valves (not shown) for actuating the extension and retraction of the cylinders. Referring to FIG. 2, as the compacting cylinders extend rearwardly, the movement of the cylinders causes the lower packing assembly 70 to swing rearwardly, which in turn causes the lower face plate 104 to move the material on the lower hopper floor 46 into the lower compartment 44. The compacting force of the lower packing assembly 70 is transmitted via the connecting links 82 to the upper packing assembly 80 so that the upper packing assembly swings rearwardly simultaneously with the lower packing assembly 70. As the upper packing assembly 80 swings rearwardly, the upper face plate 144 contacts the material on the upper hopper floor 56 and moves it into the upper compartment 42.

A reversing of the hydraulic control valve (not shown) causes the upper and lower packing assemblies to return to their forward-most starting positions, as shown in FIG. 2. In the forward-most starting position, the top edge of the lower front packing face plate 104 is aligned with the bottom edge of the chute front wall 47, while the bottom of the chute front wall 57 overlies the top face 142 of the upper packing assembly. The upwardly curved top faces 102 and 142 of the lower and upper packer blades serve to keep material from falling behind the packing face plates 104 and 144 during the various travel positions of the packer blades. Any material that might collect on the top plates is swept clean by the front chute walls 47 and 57 when the packer blades return to their starting positions.

Figure 4:
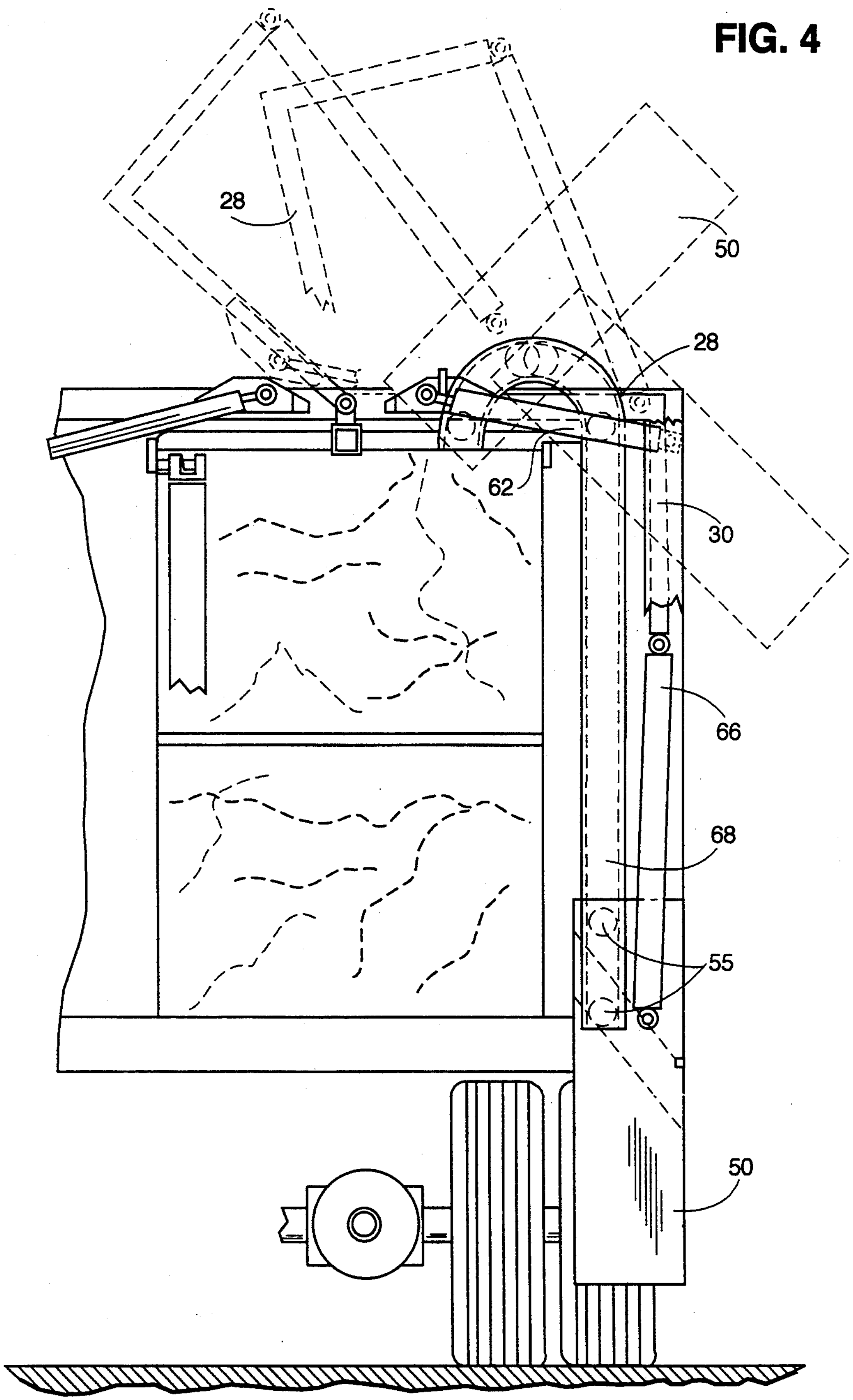
FIG. 4 is a partial vertical section of the front end of the material collecting vehicle illustrating the lifting means.

Referring now to FIGS. 1 and 4, material is introduced into the hopper assembly 17 by elevating a trough 50 from the lowered position shown to a position above the loading openings 25, 26 as shown in phantom FIG. 4 using any suitable lifting mechanism. Although only one side of the material-receiving vehicle is illustrated in FIG. 1, it will be appreciated that each container side wall 22 of the vehicle can be provided with a trough 50 and a lifting mechanism to permit dual sided loading into the hopper assembly 17.

The trough 50 is divided by a vertical divider deflector 51 into two separate lateral bins 52 and 54. Each bin may be selected for a separate type of material, such as non-recyclable material in bin 52 and recyclable material in bin 54. The divider deflector 51 not only divides the trough 50 into bins, but also serves to deflect the separated material properly into the hopper assembly 17 to prevent commingling. The trough 50 is positioned with respect to the hopper assembly 17 so that the divider deflector 51 of the trough is aligned with the bearing header 49 when the trough is in its raised position, as shown in phantom in FIG. 4. This alignment permits material placed in bin 52 to be discharged through loading opening 25 and onto the lower hopper floor 46, and material placed in bin 54 to be discharged through loading opening 26 and onto the upper hopper floor 56.

Although any of the well-known lift mechanisms can be used for elevating and moving the trough 50 from its lowered loading position to its raised dumping position, for purposes of illustration, a hydraulic lift and link system in combination with a pair of vertically extending parallel guide tracks 68 is shown. The guide tracks 68 are positioned on the exterior of the container side wall 22 in the area adjacent the hopper assembly 17 and have arcuate upper ends that curve over the loading openings 25 and 26. Engaged slideably within each guide track 68 is a pair of guide rollers 55 mounted at each side of the trough 50.

The hydraulic lift and link system comprises a pair of connecting links 66 (only one of which is shown in FIG. 4), each of which is pivotally mounted at its base end to a respective side of the trough 50, and pivotally mounted at its opposite end to the base of a side beam 30 that extends vertically along the exterior of the container side wall 22. The side beam 30 is rigidly attached at its top end to a cover 28 that overlies the loading openings 25 and 26. A pair of hydraulically actuated lift cylinders 62 (only one of which is shown) are pivotally mounted at one end thereof to a respective side of the cover 28 and at the opposite end thereof to the container sidewall 22. Actuation of the lifting cylinders 62 raises the cover 28, causing the side beams 30 and connecting links 66 to move upwardly, thereby simultaneously elevating the trough 50 within the guide track 68. As the guide rollers 55 on the trough 50 reach the upper ends of the guide tracks 68, the top of the trough is inclined toward the loading openings 25 and 26 on an angle that permits the contents of the trough to be discharged into the hopper assembly 17.

Continued loading of the trough, elevating and discharging its contents and the repeated actuation of the compacting process results in filling to capacity the upper and lower compartments 42 and 44, respectively. Once the compartments are filled, the non-discharge end 18 of the container is elevated approximately 30 degrees, as shown in phantom in FIG. 1, to begin the discharging procedure. The primary discharge tailgate 34 is then opened to discharge the material in the upper compartment while the secondary discharge tailgate 36 remains closed. Once the material in the upper compartment is discharged, the vehicle is moved to another area and the secondary discharge tailgate 36 is opened to discharge the material in the lower compartment. Thus, the primary and secondary discharge tailgates permit the material in the upper and lower compartments to be separately discharged to prevent commingling of the separated materials. The discharging process in each compartment may be initially assisted by powering the upper and lower packing assemblies.

Although the packing apparatus is illustrated in the context of a vehicle, it will be appreciated by those skilled in the art, that the packing apparatus need not be mounted on a truck chassis and can be adapted for stationary packing operations.

Figure 5:
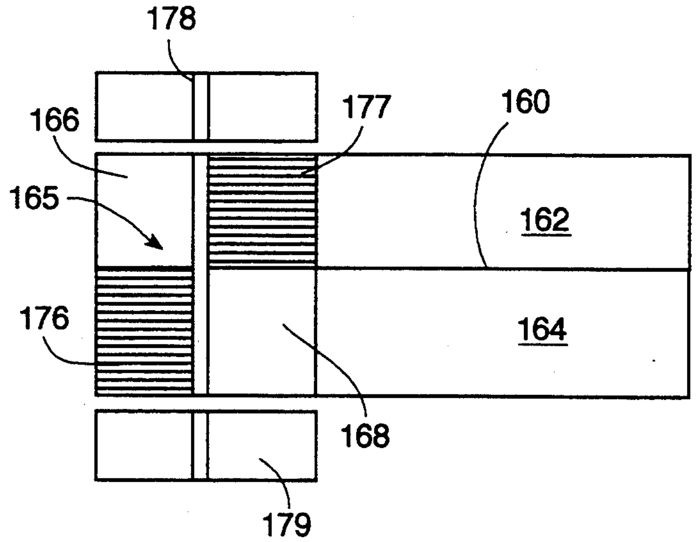
FIG. 5 is a horizontal section of an alternative embodiment of the container body of a material collecting vehicle.
Figure 6:
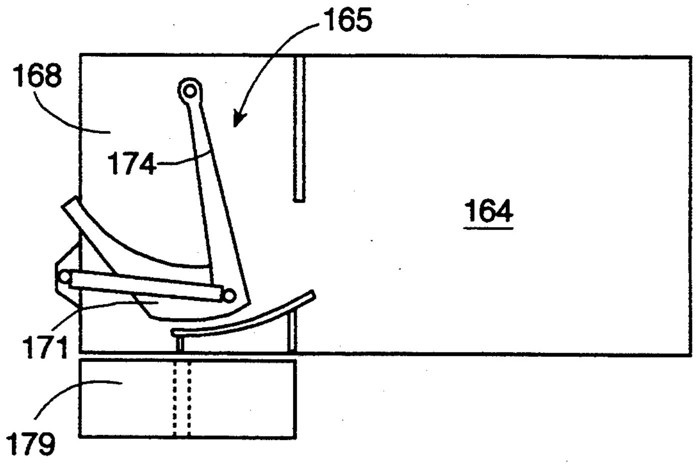
FIG. 6 is a side view of the alternative embodiment of FIG. 5, cut away to illustrate the packing mechanism.
Figure 7:
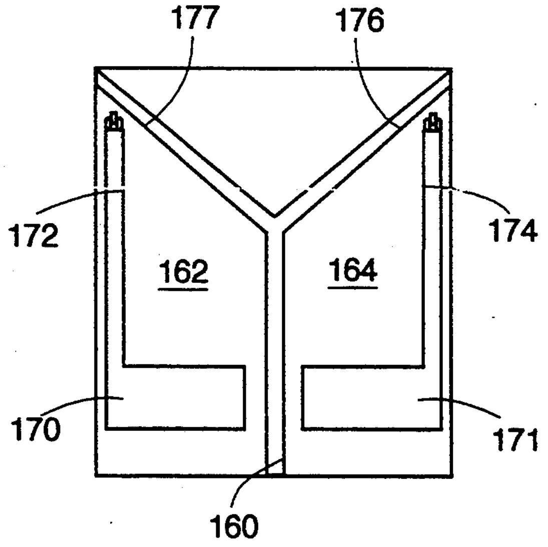
FIG. 7 is a front end view of the alternative embodiment of FIG. 5, cut away to illustrate the packing mechanism.

Many other expedients and variations will suggest themselves to one of ordinary skill in the art. These modifications may be carried out without departing from the present invention. For example, as illustrated in FIGS. 5–7, instead of a horizontal partition, the material-receiving container may be provided with a vertical longitudinal partition 160 that divides the container into left and right material-receiving compartments 162, 164, respectively.

In this embodiment, the material-receiving container has a hopper assembly 165, in which is mounted a packing device having left and right packing assemblies for compacting the material into the left and right material-receiving compartments 162 and 164, respectively. The packing device includes left and right packer blades 170, 171 which are arranged side-by-side within the hopper 165. The packer blades are similar to the packer blades described in connection with FIGS. 2–3, except that each packer blade has a single swing arm 172, 174, respectively, which is cantilevered from a respective side wall of the material-receiving container. The hopper assembly 165 includes a chute wall 176 which is downwardly inclined from the side of the material-receiving container to its longitudinal midline, and serves to guide material onto a left hopper floor 166 while preventing it from entering the right hopper floor 168. An oppositely inclined chute wall 177 similarly serves to guide material onto the right hopper floor 168 while preventing it from reaching the left hopper floor 166. Material is received by the hopper assembly 165 from laterally divided bins 178, 179, which are raised into position above the hopper assembly and lowered to a curbside position by a lifting means (not shown) like that described in connection with FIGS. 1 and 4.

Figure 8:
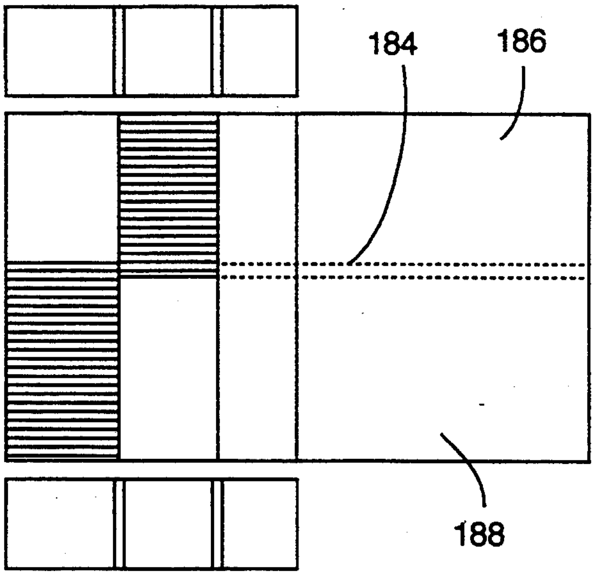
FIG. 8 is a horizontal section of a second alternative embodiment of the container body of a material collecting vehicle.
Figure 9:
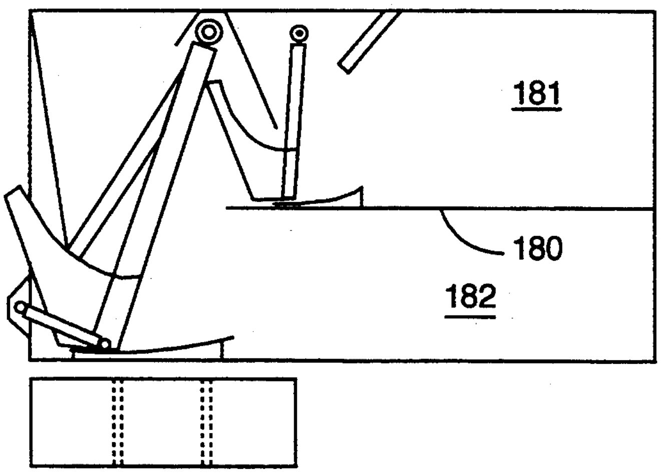
FIG. 9 is a side view of the alternative embodiment of FIG. 8, cut away to illustrate the packing mechanism.
Figure 10:
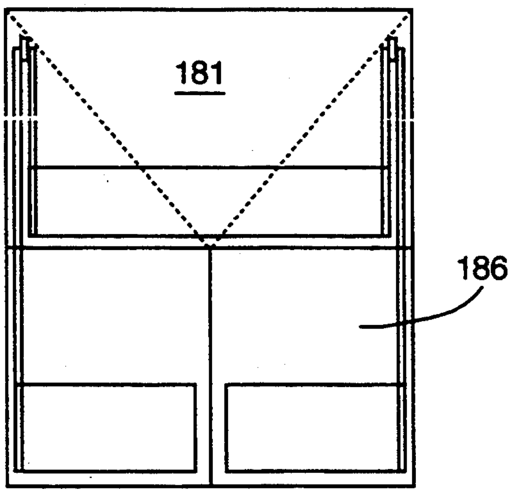
FIG. 10 is an end view of the alternative embodiment of FIG. 8.

The material-receiving container can also be provided with combinations of both horizontal and vertical partitions. For example, as illustrated in FIGS. 8–10, the material-receiving container can be divided by a horizontal partition 180 into upper and lower compartments 181, 182, respectively, and a vertical partition 184 can further divide the lower compartment into left and right sub-compartments 186, 188. Alternatively, the upper compartment can be subdivided into left and right sub-compartments, or both the upper and lower compartments can be subdivided. Other variations and combinations of partitions will occur to those skilled in the art.

Figure 11:
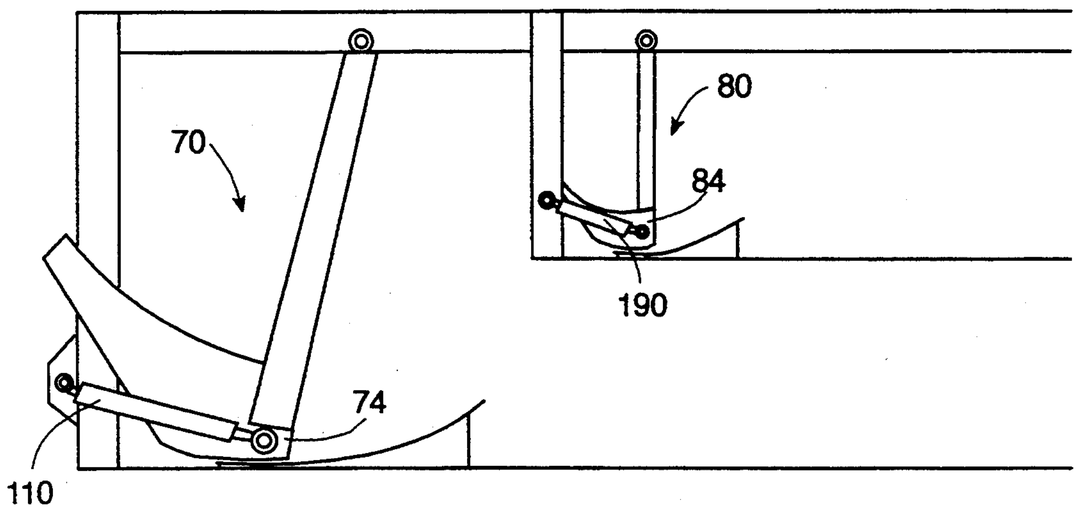
FIGS. 11-12 show alternative embodiments to the linking mechanism for the packing platens.

Modifications may also be made to the mechanism linking the packing assemblies together. For example, as illustrated in FIG. 11, the upper and lower packing assemblies 80 and 70 could each be provided with a pair of hydraulic cylinders 190, 110, respectively (only one member of each pair is shown) so that the packing platens move independently of each other. In this modification, it would not be necessary to have any connecting links connecting the swing arms together, and operation of the two packing platens would be totally independent.

Figure 12:
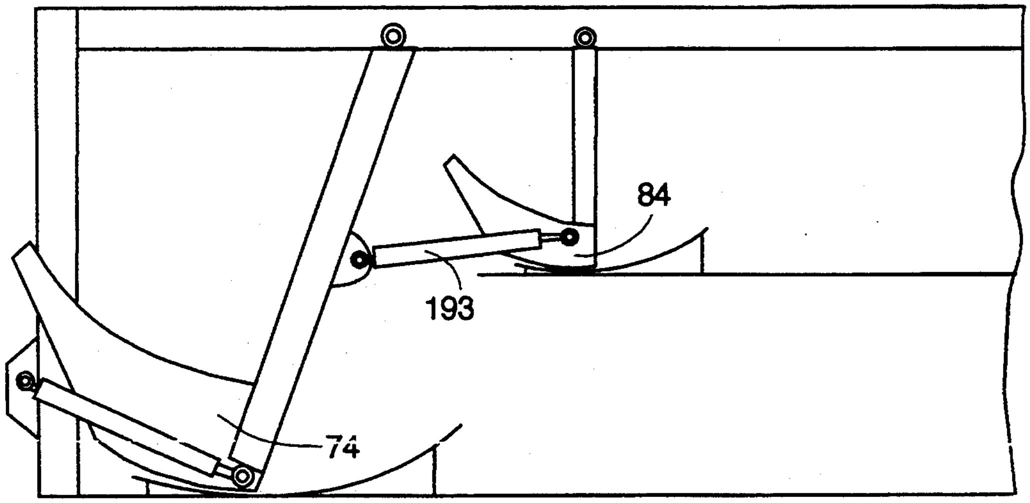

As illustrated in FIG. 12, a pair of hydraulic cylinders 193 (only one of which is shown) can be substituted for the connecting links to connect the lower packer blade 74 with the upper packer blade 84. Other mechanisms that could be substituted for the connecting links include compression springs, or a combination of connecting links and compression springs. It would also be possible to use a chain drive, or a spring and chain combination, to connect the packing platens together and pull them toward the discharge end of the container.

Figure 13:
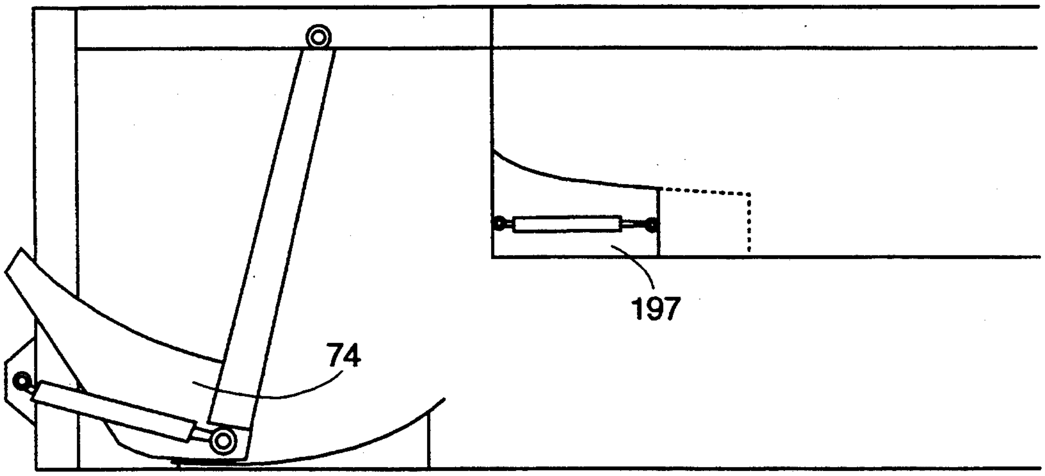
FIG. 13 shows an alternative embodiment for the packing mechanism.

Finally, it is contemplated that modifications may be made to the packing device without departing from the spirit of the invention. For example, as illustrated in FIG. 13, one of the packer blades could be a reciprocating packer blade 197 that travels linearly along a guide track, as shown in phantom, while the other packer blade 74 swings pendularly, as previously described.

It will be appreciated that the packing device disclosed herein may be embodied in other specific forms without departing from the spirit or central characteristics thereof. The preferred embodiment described herein is therefore to be considered in all respects as illustrative and not restrictive, the scope of the invention being indicated by the appended claims, rather than by the foregoing description of the preferred embodiment, and all changes which come within the meaning and range of equivalency of the claims are intended to be embraced therein.

We claim:

1. An improved storage and packing apparatus for material comprising:

a material-receiving container having a bottom wall, two opposed sidewalls, a discharge end and a non-discharge end, a hopper assembly adjacent the non-discharge end and at least one partition subdividing the container into a first material-receiving compartment and a second material-receiving compartment, with the first and second material-receiving compartments each having a material-discharge end and a material-non-discharge end, and with the material-receiving container further having a material-receiving opening and a normally closed material-discharge opening;

a first packing assembly disposed within the hopper assembly and moveable between a first position adjacent to the non-discharge end of the container along a non-linear path to a second position so as to move material into and compact it within the first compartment;

a second packing assembly disposed within the hopper assembly and moveable between a first position adjacent to the non-discharge end of the material-receiving container to a second position so as to move material into and compact it within the second material-receiving compartment;

means for moving the first packing assembly between its first and second positions; and means for moving the second packing assembly between its first and second positions.

2. The improved material storage and packing apparatus of claim 1 wherein the material-receiving container includes at least one horizontally longitudinally extending partition that defines the first and second compartments in the material-receiving container so that the first and second compartments are arranged in the container one on top of the other.

3. The improved material storage and packing apparatus of claim 1 wherein the material-receiving container includes at least one vertically longitudinally extending partition that defines the first and second compartments in the material-receiving container so that the first and second compartments are arranged in the container side-by-side.

4. The improved material storage and packing apparatus of claim 1 wherein the second packing assembly moves along a non-linear path as the first packing assembly is moved between its first position and its second position.

5. The improved material storage and packing apparatus of claim 1 wherein the moving means for the first and second packing assemblies are operated such that the first and second packing assemblies in the hopper assembly are moved simultaneously between their first and second positions; and wherein the moving means for the first and second packing assemblies also move the first and second packing assemblies, respectively, from their second to their first positions.

6. The improved material storage and packing apparatus of claim 5 wherein at least one hydraulic cylinder connects the first packing assembly with the second packing assembly so that the first and second packing assemblies move simultaneously between their first and second positions.

7. The improved material storage and packing apparatus of claim 1 wherein the discharge ends of the first and second compartments are each adjacent to the discharge end of the material-receiving container;

and wherein the discharge end of the material-receiving container is normally closed when the first and second packing assemblies are moved between their first and second positions.

8. The improved material storage and packing apparatus of claim 1 which includes means for opening the discharge end of the material-receiving container so that compacted material may be discharged from at least one of the first and second compartments.

9. A storage and packing apparatus for material comprising;

a material-receiving container having a bottom wall, two opposed sidewalls, a discharge end and a non-discharge end, a hopper assembly adjacent the non-discharge end and at least one partition subdividing the container into a first material-receiving compartment and a second material-receiving compartment, with the first and second material-receiving compartments each having a material-discharge end and a material-non-discharge end, and with the material-receiving container further having a material-receiving opening and a normally closed material-discharge opening;

a first packing assembly disposed within the hopper assembly and moveable between a first position adjacent to the non-discharge end of the container along a non-linear path to a second position so as to compact material within the first compartment, the first packing assembly including a first packer blade connected with a first pair of swing arms for pendular movement therewith;

a second packing assembly disposed within the hopper assembly and moveable between a first position adjacent to the non-discharge end of the material-receiving container to a second position so as to compact material within the second material-receiving compartment, the second packing assembly including a second packer blade connected with a second pair of swing arms for pendular movement therewith;

means for moving the first packing assembly between its first and second positions; and means for moving the second packing assembly between its first and second positions.

10. The improved material storage and packing apparatus of claim 9 wherein the first pair of swing arms are each pivotally mounted adjacent to the material-receiving opening in the material-receiving container; and wherein the second pair of swing arms are each pivotally mounted adjacent to the material-receiving opening in the material-receiving container.

11. An improved storage and packing apparatus for material comprising:

a material-receiving container having a bottom wall, two lateral side walls, a top wall having a material-receiving opening, a hopper assembly disposed immediately below the opening, a discharge end and a non-discharge end, and at least one horizontal longitudinally extending partition subdividing the container into upper and lower separate compartments;

a packing device within the hopper assembly for compacting the material simultaneously within the compartments, the packing device comprising a first pair of swing arms, each of which is pivotally mounted adjacent the top wall for pendular movement toward and away from the discharge end and extends downward toward the bottom wall, with one of the swing arms being adjacent to one of the side walls and the other swing arm being adjacent to the other side wall, a lower packer blade mounted at its sides to the first pair of swing arms for pendular movement therewith, the lower packer blade serving to compact the material received in the lower compartment, a second pair of swing arms each of which is pivotally mounted adjacent the top wall rearward of the first pair of swing arms for pendular movement toward and away from the discharge end and extends downward toward the horizontal partition, with one of the swing arms being adjacent to one of the side walls and the other swing arm being adjacent to the other side wall, an upper packer blade mounted at its sides to the second pair of swing arms for pendular movement therewith, the upper packer blade serving to compact the material received in the upper compartment, and connecting links pivotally mounted to the first and second pairs of swing arms for connecting the first pair of swing arms to the second pair of swing arms for simultaneous pendular movement;

and power operated means for causing pendular movement of the packing device to compact the material received in the container.

12. The material storage and packing apparatus according to claim 11, wherein the lower packer blade includes a substantially vertical packing face plate having an upper edge.

13. The storage and packing apparatus according to claim 12, wherein the lower packer blade includes a forwardly extending, upwardly curved portion that terminates at its rearward end in the upper edge of the lower packing face plate.

14. The storage and packing apparatus according to claim 11 wherein the power operated means comprises a pair of expandable hydraulic cylinders, each of which is pivotally connected to the lower packer blade.

15. The storage and packing apparatus according to claim 14, wherein the hydraulic cylinders cause reciprocal pendular movement of both the lower packer blade and the upper packer blade.

16. The storage and packing apparatus according to claim 12, wherein the hopper assembly has a lower material-receiving area and an upper material-receiving area, and the material-receiving opening is divided into a forward section, through which the lower material-receiving area receives material, and a rearward section, through which the upper material-receiving area receives material.

17. The storage and packing apparatus according to claim 16, wherein the lower material-receiving area includes a rearwardly inclined front wall, the base of which is aligned with the lower packing face plate when the lower packer blade is in its forward-most position.

18. The storage and packing apparatus according to claim 11, wherein the material-receiving container is supported on a vehicle including an elongated vehicle chassis and wheels supporting the chassis.

19. A storage and packing apparatus for material comprising;

a material-receiving container having a bottom wall, two opposed sidewalls, a discharge end and a non-discharge end, a hopper assembly adjacent the non-discharge end and at least one partition subdividing the container into a first material-receiving compartment and a second material-receiving compartment, with the first and second material-receiving compartments each having a material-discharge end and a material-non-discharge end, and with the material-receiving container further having a material-receiving opening and a normally closed material-discharge opening;

a first packing assembly disposed within the hopper assembly and moveable between a first position adjacent to the non-discharge end of the container along a non-linear path to a second position so as to compact material within the first compartment;

a second packing assembly disposed within the hopper assembly and moveable between a first position adjacent to the non-discharge end of the material-receiving container to a second position so as to compact material within the second material-receiving compartment;

means for connecting the first packing assembly with the second packing assembly so that the first and second packing assemblies move simultaneously between their first and second positions; and means for moving the first and second packing assemblies between their first and second positions.

* * * * *